(12) United States Patent  
Pai et al.

(10) Patent No.: US 7,911,532 B2
(45) Date of Patent: Mar. 22, 2011

(54) NOTEBOOK COMPUTER AND METHOD OF CAPTURING DOCUMENT IMAGE USING IMAGE PICKUP DEVICE OF SUCH NOTEBOOK COMPUTER

(75) Inventors: Tung-Hsuan Pai, Taipei (TW); Wen-Lung Chou, Taipei (TW); Meng-Tsung Su, Taipei (TW)

(73) Assignee: Primax Electronics Ltd., Taipei (TW)

( * ) Notice: Subject to any disclaimer, the term of this patent is extended or adjusted under 35 U.S.C. 154(b) by 374 days.

(21) Appl. No.: 12/210,485

(22) Filed: Sep. 15, 2008

(65) Prior Publication Data

US 2009/0262209 A1 Oct. 22, 2009

(30) Foreign Application Priority Data

Apr. 18, 2008 (TW) ............................... 97114217 A

(51) Int. Cl.
*H04N 5/225* (2006.01)
*G06F 1/16* (2006.01)
*H05K 5/00* (2006.01)
*G06K 9/36* (2006.01)

(52) U.S. Cl. .................... 348/376; 361/679.27; 382/275

(58) Field of Classification Search .................. 348/373, 348/552, 376; 361/679.55, 679.26, 679.27, 361/679.28; 382/275
See application file for complete search history.

(56) References Cited

U.S. PATENT DOCUMENTS

| | | | |
|---|---|---|---|
| 2003/0156201 A1* | 8/2003 | Zhang | 348/222.1 |
| 2004/0218069 A1* | 11/2004 | Silverstein | 348/239 |
| 2005/0078879 A1* | 4/2005 | Sakurai et al. | 382/275 |
| 2005/0190986 A1* | 9/2005 | Sakurai | 382/275 |
| 2008/0151099 A1* | 6/2008 | Lin et al. | 348/376 |
| 2008/0279454 A1* | 11/2008 | Lev et al. | 348/373 |
| 2009/0231483 A1* | 9/2009 | Seddik et al. | 348/373 |
| 2010/0033603 A1* | 2/2010 | Lefebure et al. | 348/241 |

* cited by examiner

*Primary Examiner* — Jason Whipkey
(74) *Attorney, Agent, or Firm* — Kirton & McConkie; Evan R. Witt

(57) ABSTRACT

The notebook computer includes a base and an upper cover. The base has a keyboard. The upper cover includes a screen, an image pickup device and a close-up lens. The upper cover is rotatable with respect to the base such that the image pickup device is able to capture an image of a document on a working plane. After the document image is obtained by the image pickup device, a built-in image processing program performs correction on the document image so as to obtain a corrected document image.

11 Claims, 6 Drawing Sheets

301

The profit potential of offering Earth's fist lodgings have also not escaped notice. Rob the owner of Budget Suites of America, whi him quite wealthy, is now investing more tha lion of his own money in building the world ing commericial space station. If the succee ambitious plan, Bigelow's business plan is for rent out suites on the space station for $18.9

The profit potential of offering Earth's fist lodgings have also not escaped notice. Rob the owner of Budget Suites of America, whi him quite wealthy, is now investing more tha lion of his own money in building the world ing commericial space station. If the succee ambitious plan, Bigelow's business plan is for rent out suites on the space station for $18.9

FIG.4

NOTEBOOK COMPUTER AND METHOD OF CAPTURING DOCUMENT IMAGE USING IMAGE PICKUP DEVICE OF SUCH NOTEBOOK COMPUTER

FIELD OF THE INVENTION

The present invention relates to a notebook computer, and more particularly to a notebook computer with an image pickup device. The present invention also relates to a method of capturing an image of a document by using image pickup device of a notebook computer.

BACKGROUND OF THE INVENTION

Recently, most notebook computers have built-in image pickup devices for taking photographs or holding video conferences. With increasing development of digital techniques, text documents are gradually created as electronic files. Generally, text documents are scanned by scanning apparatuses and then saved as electronic files such as PDF (Portable Document Format) files. In a case that no scanning apparatus is linked to the notebook computer, the images of simple documents such as single-sided papers or business card may be captured by the built-in image pickup device. The images captured by the built-in image pickup device are usually saved as JPEG (Joint Photographic Experts Group) files. Most users prefer using scanning apparatuses to scan the text documents as PDF files because the texts and signs contained in the PDF files are readable by the computer systems and may be converted as editable text files.

As known, optical character recognition (OCR) is a process of capturing an image of a document and then extracting the texts from that image. Recently, it is possible to analyze images that are captured from the image pickup device by the OCR technique and saved as JPEG files. As a consequence, individual texts or signs contained in the JPEG files are recognized and converted as editable text files. Since the associated OCR techniques are well established, the image pickup device is gradually adopted to obtain electronic files of the documents.

When an image pickup device of a notebook computer is used to capture the image of a document, some difficulties possibly occur. For example, it is critical to hold the document steady. In a case that a document to be captured by the image pickup device of the notebook computer is held by the user's hand, the document is readily rocked due to the long holding time. Under this circumstance, the obtained document image is usually blurred. For preventing from rocking of the document and thus obtaining a sharp document image, a static document stand is used for holding the document steady. The use of the document stand, however, incurs another problem. In a case that the document stand is used in other places, the user should carry the notebook computer and the document stand at the same time, which is very troublesome to the user.

For convenience, the document is directly placed on a working plane (e.g. a desk plane) without the need of the document stand. After the document is placed on a proper location of the working plane, the upper cover of the notebook computer is rotated such that the image pickup device is aligned with or close to the document. Meanwhile, the image of the document is captured by the image pickup device. Since the focal length for a general image pickup device is approximately 60 centimeters, the distance between the image pickup device and the document is possibly smaller than the preset focal length (approximately 60 centimeters) if the upper cover is rotated to have the image pickup device be aligned with the document. Under this circumstance, the obtained image of the document is blurred and thus fails to be recognized by the naked eyes.

For obviating the drawbacks encountered from the prior art, there is a need of providing a notebook computer having an image pickup device to capture a sharp image of a document placed on a working plane without the need of carrying the document stand.

SUMMARY OF THE INVENTION

An object of the present invention provides a notebook computer having an image pickup device to capture a sharp image of a document placed on a working plane.

In accordance with an aspect of the present invention, there is provided a notebook computer for capturing an image of a document on a working plane. The notebook computer includes a base and an upper cover. The base has a keyboard for inputting characters or signs therevia. The upper cover is coupled to the base and rotatable with respect to the base, and includes a screen, an image pickup device and a close-up lens. The screen is used for displaying the image of the document. The image pickup device is disposed on an upper edge of the upper cover for capturing the image of the document when the upper cover is rotated with respect to the base to create a specified included angle between the upper cover and the base. The close-up lens is used for shortening the focal length of the image pickup device. An image processing program is installed in the notebook computer for performing an image processing operation on the document after the image of the document on the working plane is captured by the image pickup device.

In an embodiment, the upper cover further comprises a recess structure and the close-up lens has a hooking element engaged with the recess structure such that the close-up lens is fixed on the upper cover.

In an embodiment, the image processing operation performed by the image processing program includes trapezoidal correction, contrast enhancement, background removal or optical character recognition.

In an embodiment, distortion of the image of the document is corrected by the trapezoidal correction when the included angle is within a preset angle range, and the preset angle range is determined according to the thickness of the notebook computer or the location of the document.

In an embodiment, the image processing operation further comprises an included angle adjusting procedure for correcting the image of the document if the included angle between the upper cover and the base is beyond the preset angle range.

In an embodiment, the included angle adjusting procedure comprises steps of: placing the document on a calibration paper having multiple checkers to cover a portion of the calibration paper, wherein borders of the document are substantially parallel with vertical and horizontal lines of the checkers; capturing an image of the document and the calibration paper to obtain a tilted image, wherein the tilted image a tilted document image area and a tilted calibration paper image area; and performing shape correction to correct corners of the checkers shown in the tilted calibration paper image into right angles.

In an embodiment, the included angle is 90° and the notebook computer further comprises a refractor arranged on the close-up lens for capturing the image of the document.

In an embodiment, the image processing operation performed by the image processing program includes trapezoidal correction, contrast enhancement, background removal or optical character recognition.

In accordance with another aspect of the present invention, there is provided a method of capturing an image of a document by an image pickup device of a notebook computer. The notebook computer is placed on a working plane and includes a base and an upper cover. The upper cover included the image pickup device and a close-up lens. The image pickup device is disposed on an upper edge of the upper cover. The close-up lens is disposed on a side of the image pickup device. The method includes the following steps. A calibration paper having multiple checkers is placed on the working plane such that the calibration paper is disposed in one side of the notebook computer. Then, the document is placed on the calibration paper to cover a portion of the calibration paper. Then, the upper cover of the notebook computer is rotated such that the image pickup device and the close-up lens are aligned with the document and the calibration paper. The image of the document and the calibration paper is captured by the image pickup device and the close-up lens, thereby obtaining a tilted image, wherein the tilted image a tilted document image area and a tilted calibration paper image area. The corners of the checkers shown in the tilted calibration paper image are corrected into right angles, thereby obtaining a tilt correcting parameter. Then, an image processing operation is performed on the tilted document according to the tilt correcting parameter, thereby obtaining a corrected document image. Afterwards, whether the corrected document image is sharp or blurred is discriminated. If the corrected document image is sharp, the tilt correcting parameter is recorded and an image of another document is captured by the image pickup device according to the tilt correcting parameter. Whereas, if the corrected document image is blurred, a warning sound is issued from the notebook computer to warn a user of adjusting the included angle.

In an embodiment, an aspect ratio of the corrected document image is an index of discriminating whether the corrected document image is sharp or blurred.

In an embodiment, the corrected document image is sharp if the aspect ratio of the corrected document image is smaller than or equal to a sharpness threshold value, or the corrected document image is blurred if the aspect ratio of the corrected document image is greater than the sharpness threshold value.

In an embodiment, the image processing operation performed by the image processing program includes trapezoidal correction, contrast enhancement, background removal or optical character recognition.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 3 is a schematic view illustrating a document image obtained in the first preferred embodiment of the present invention;

FIG. 4 is a schematic view illustrating a corrected document image obtained in the first preferred embodiment of the present invention;

DETAILED DESCRIPTION OF THE PREFERRED EMBODIMENT

Figure 1:
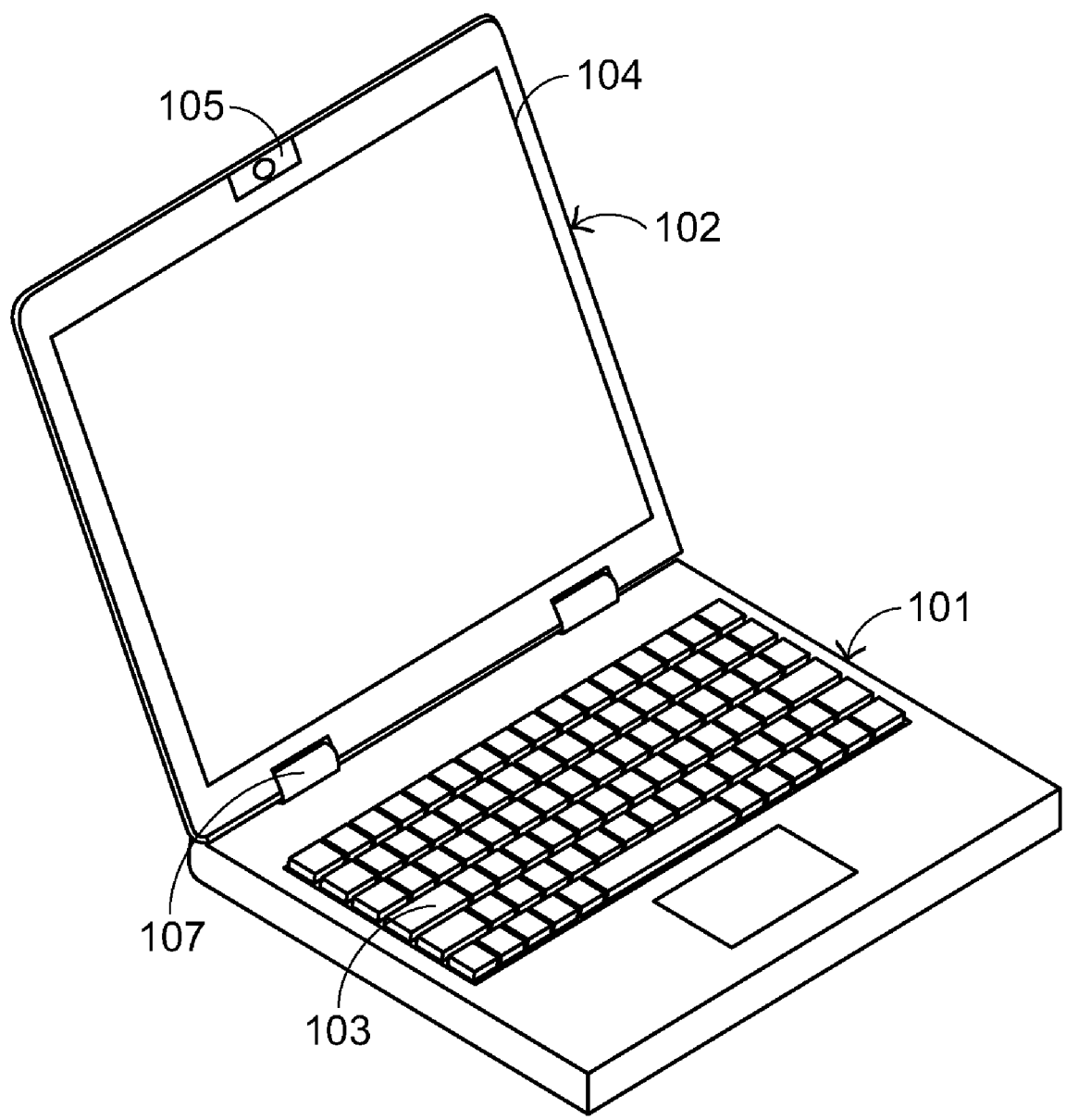
FIG. 1 is a schematic perspective view illustrating partial components of a notebook computer according to a first preferred embodiment of the present invention.

FIG. 1 is a schematic perspective view illustrating partial components of a notebook computer according to a first preferred embodiment of the present invention. The notebook computer 100 of FIG. 1 principally comprises a base 101 and an upper cover 102. A keyboard 103 is mounted on the base 101. Via the keyboard 103, the user may input characters or signs. The upper cover 102 comprises a screen 104 and an image pickup device 105. The image pickup device 105 is disposed on an upper edge of the upper cover 102 for capturing an image of a document. The screen 104 is a display device that displays operating conditions of the notebook computer 100. In a case that an image is captured by the image pickup device 105, the image is shown on the screen 104. The upper cover 102 is pivotally coupled with the base 101 about a rotating shaft 107 such that the upper cover 102 is rotatable with respect to the base 101. So far, the configurations of the notebook computer 100 are substantially identical to the conventional notebook computers. As previously described, the document image obtained by the conventional notebook computer is usually blurred because the focal length of the image pickup device is relatively large. In other words, it is not appropriate to place the document on the working plane by the conventional notebook computer. For obviating the drawbacks encountered from the prior art, the notebook computer 100 of the present computer further comprises a close-up lens 106 beside the image pickup device 105, as is shown in FIG. 2.

Figure 2:
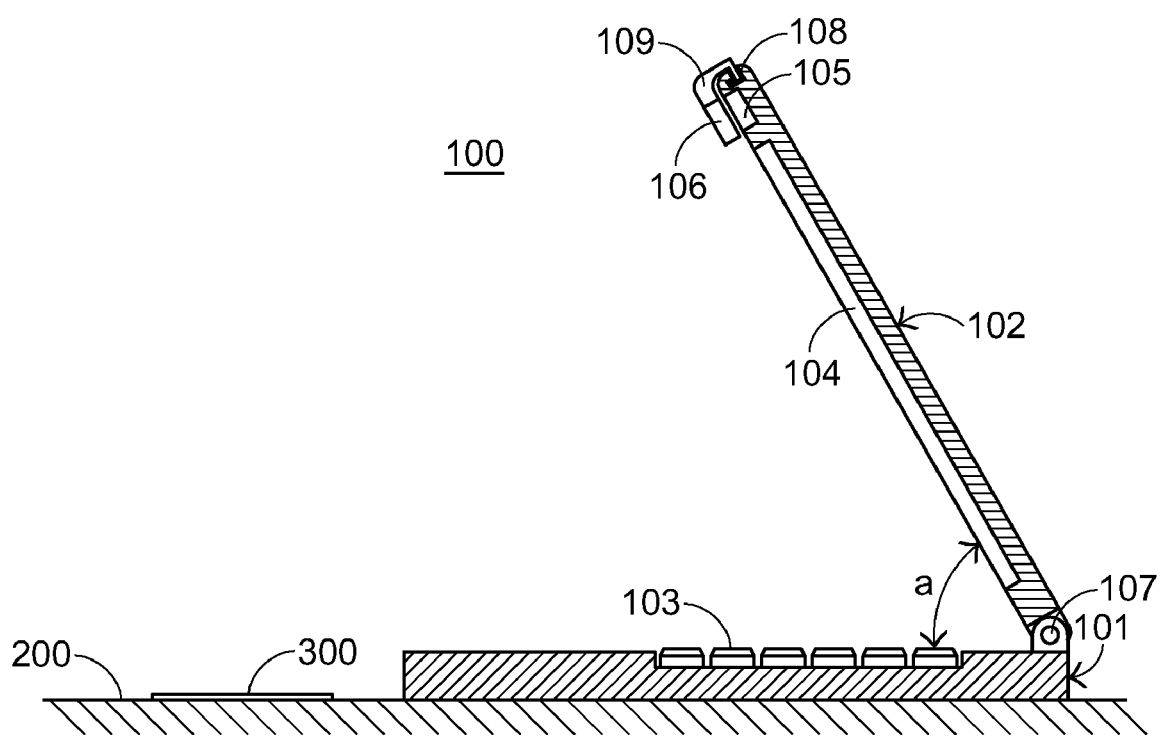
FIG. 2 is a schematic side view of the notebook computer according to the first preferred embodiment of the present invention.

FIG. 2 is a schematic side view of the notebook computer according to the first preferred embodiment of the present invention. The notebook computer 100 further comprises a recess structure 108 in the upper cover 102. In a case that the close-up lens 106 is arranged on the front end of the image pickup device 105, a hooking element 109 of the close-up lens 106 is inserted into the recess structure 108 and engaged with the recess structure 108, so that the close-up lens 106 is fixed on one side of the image pickup device 105. The use of the close-up lens 106 may facilitate shortening the focal length of the image pickup device 105 and thus the image pickup device 105 is able to capture the image of close objects. That is, the image of the document to be captured by the image pickup device 105 may be placed on a working plane by means of the close-up lens 106. Please refer to FIG. 2 again. The notebook computer 100 is placed on a working plane 200. A document 300 is also placed on the working plane 200 and the document 300 is located in front of the notebook computer 100. The document 300 may be any kind of paper-based document such as a book, a single paper sheet with arbitrary size or a small card (e.g. a business card).

For capturing an image of an article contained in the document 300 and saving the image as an electronic file, the upper cover 102 is rotated about the rotating shaft such that there is a proper included angle a between the upper cover 102 and the base 101 and the image pickup device 105 is aligned with the document 300. Moreover, according to the manufacturer's design, a specified key of the keyboard 103 is triggered to activate the image pickup device 105. For example, when the image pickup device 105 of the notebook computer 100 is in a ready-for-capture mode, a space bar located at an edge of the keyboard 103 may be triggered to activate the image pickup device 105 to capture the image of the document 300. After the space bar has been depressed by the user for a specified time period (e.g. 5 second), the image of the document 300 is captured. The specified time period is sufficient for the user to rotate the upper cover 102 such that the image pickup device 105 is aligned with the document 300. In a case that the image pickup device 105 is aligned with the document 300, a document image 301 as shown in FIG. 3 is obtained. Due to the included angle a between the upper cover 102 and the base 101, the lens of the image pickup device 105 fails to be parallel with the surface of the document 300. In other words, since the lens of the image pickup device 105 looks downs at the document 300 at a specified angle, the document image 301 is distorted as a tilted image. The tilting extent of the document image 301 is dependent on the included angle a between the upper cover 102 and the base 101. For correcting the document image 301, an image processing program is installed in the notebook computer 100.

In this embodiment, the image processing program performs a trapezoidal correction on the document image 301 in order to compensate the tilted distortion of the document image 301. After the trapezoidal correction, a corrected document image 302 as shown in FIG. 4 is obtained. In the corrected document image 302 of FIG. 4, the distorted tilting image is eliminated. In addition to the trapezoidal correction, the image processing program may be executed to implement contrast enhancement, background removal or optical character recognition on the document image 301.

As previously described, the distortion of the document image 301 resulted from the included angle a between the upper cover 102 and the base 101. In addition, the distortion of the document image 301 is also influence by the size of the notebook computer 100. Generally, as the size of the notebook computer is increased, the thickness of its base is increased. According to the thickness of the base 101, the preset angle range between the upper cover 102 and the base 101 needs to be adjusted. If no included angle adjustment is done, slight distortion is also retained on the corrected document image after the trapezoidal correction. With the proviso that the document is placed at a fixed location of the working plane, optimal preset angle ranges corresponding to various sizes of notebook computers are determined after undue experiments. In other word, when the included angle a between the upper cover 102 and the base 101 is within the preset angle range, the document image is well corrected by the image processing program.

In the first embodiment of the present invention, before the image pickup device 105 is used to capture the image of the document, the included angle between the upper cover and the base is adjusted to be within the preset angle range. Since undue experiments are necessary, the process of obtaining the preset angle range is not user-friendly. For solving this problem, a second preferred embodiment of the present invention is provided.

Figure 5:
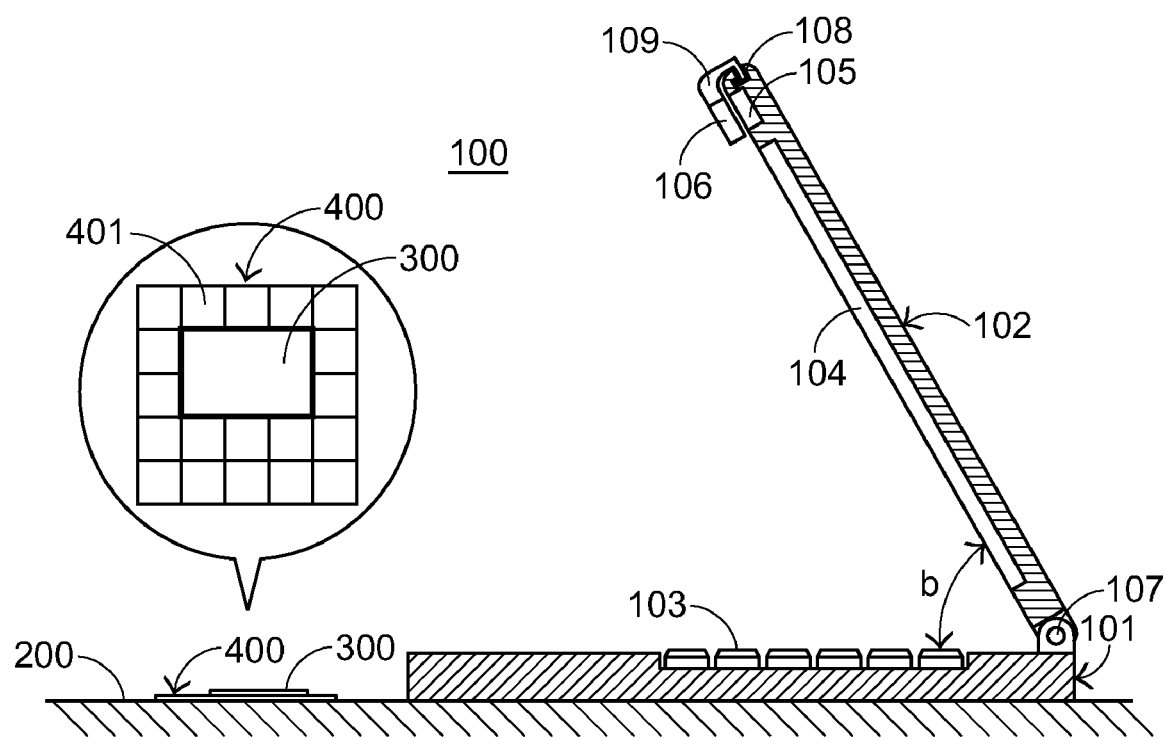
FIG. 5 is a schematic side view of the notebook computer according to the second preferred embodiment of the present invention.

FIG. 5 is a schematic side view of the notebook computer according to the second preferred embodiment of the present invention. The components contained in the notebook computer 100 of FIG. 5 are identical to those shown in FIG. 2, and are not redundantly described herein. In this embodiment, there is an included angle b between the upper cover 102 and the base 101. The included angle b is beyond the preset angle range. Since the included angle b between the upper cover 102 and the base 101 is beyond the preset angle range, the image processing program fails to effectively correct the document image. Under this circumstance, the second preferred embodiment of the present invention provides an included angle adjusting procedure for correcting the tilted document image. In this embodiment, for saving the document 300 as an electronic file, a calibration paper 400 with multiple checkers 401 is placed on the working plane 200 and the document 300 is then placed on the calibration paper 400 to cover a portion of the calibration paper 400. In addition, the borders of the document 300 are substantially parallel with vertical and horizontal lines of the checkers 401, as can be shown in the enlarged circular region of FIG. 5. After the document 300 and the calibration paper 400 are placed on proper locations, the image pickup device 105 may be activated to capture the images of the document 300 and the calibration paper 400. Meanwhile, a document image 303 as shown in FIG. 6 is obtained.

Figure 6:
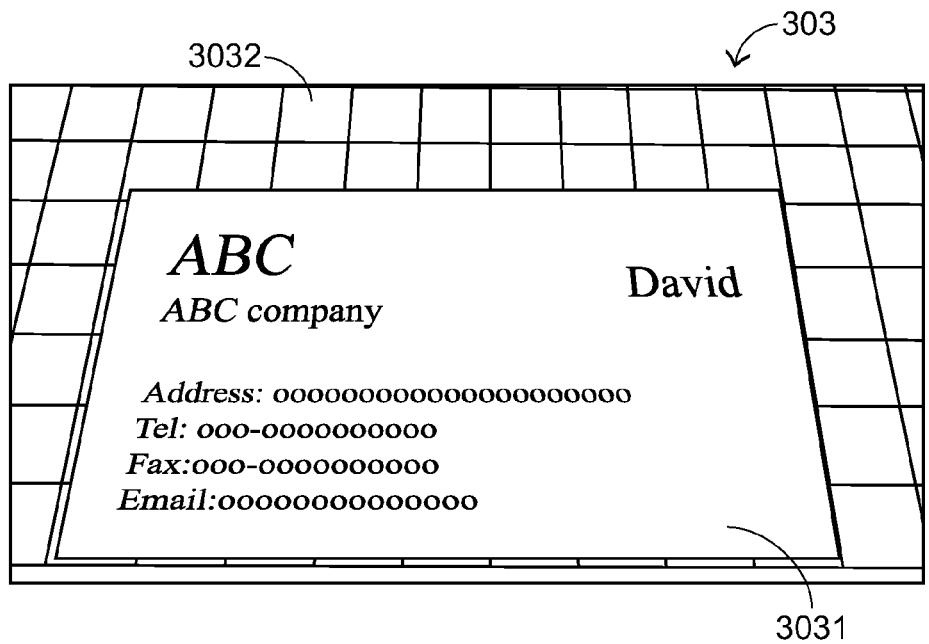
FIG. 6 is a schematic side view of the notebook computer according to the second preferred embodiment of the present invention.

FIG. 6 is a schematic view illustrating the document image obtained in the second preferred embodiment of the present invention. Similarly, the document image 303 is also distorted as a tilted image. The document image 303 includes a tilted document image area 3031 and a tilted calibration paper image area 3032. The tilting extent of the tilted document image area 3031 is identical to that of the tilted calibration paper image area 3032. When one of the tilted document image area 3031 and the tilted calibration paper image area 3032 is corrected, the other of the tilted document image area 3031 and the tilted calibration paper image area 3032 is also corrected. As shown in FIG. 6, each corner of the checkers 401 shown in the calibration paper image area 3032 is not at a right angle. By means of the image processing program, each corner of the checkers 401 shown in the calibration paper image area 3032 is corrected to be a right angle. After the correction is performed on the document image 303, a corrected document image 304 as shown in FIG. 7 is obtained.

Figure 7:
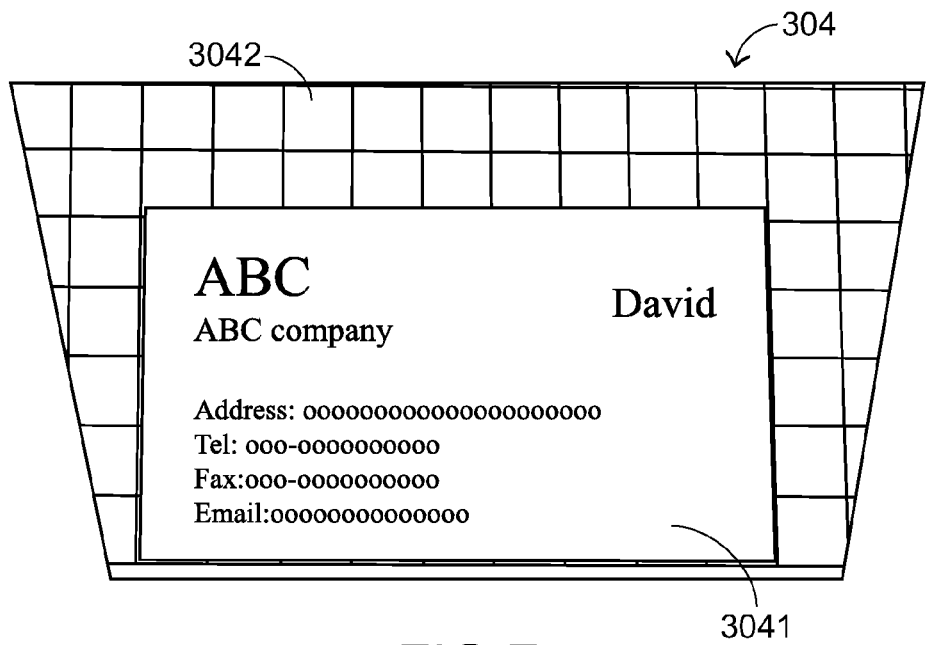
FIG. 7 is a schematic view illustrating a document image obtained in the second preferred embodiment of the present invention.

FIG. 7 is a schematic view illustrating the corrected document image 304. The corrected document image 304 includes a corrected document image area 3041 and a corrected calibration paper image area 3042. After the corrected calibration paper image area 3042 is cut off, the corrected document image area 3041 (also referred as a processed document image) is retained. Meanwhile, the image processing program will obtain a tilt correcting parameter. The tilt correcting parameter and the included angle b are recorded in the notebook computer. For capturing an image of another document by the image pickup device of the notebook computer in the next time, the image processing program will correct the image according to the tilt correcting parameter if the included angle b between the upper cover and the base is rendered, in which the document 300 and the calibration paper 400 are placed at fixed locations. In a case that another notebook computer of a different size is used or the document 300 and the calibration paper 400 are placed at different locations, the included angle adjusting procedure should be done again. Also, the included angle b and the locations of the document 300 and the calibration paper 400 are recorded. Meanwhile, the image of the document on the working plane may be captured by the image pickup device. Moreover, according to the manufacturer's design, a specified key of the keyboard 103 is triggered to activate the image pickup device. By depressing the specified key, the image pickup device is activated to capture the image of the document 300.

In practice, the included angle adjusting procedure of the present invention is able to adjust all included angles. That is, with the proviso that the document is placed on a fixed location of the working plane, the included angle adjusting procedure of the present invention is able to eliminate the error resulted from a relatively large angle or a relatively small angle. If the error of the included angle b is too large, an elongate corrected document image 304 is obtained. Since the elongate corrected document image 304 has very large long side and a very small short side, the aspect ratio of the elongate corrected document image 304 is very large. The very large aspect ratio indicates a distorted image and is not desired. For avoiding serious distortion, a preset sharpness threshold value is stored in the notebook computer 100 for discriminating whether the corrected document image 304 is sharp or blurred. If the aspect ratio of the corrected document image 304 is smaller than or equal to the sharpness threshold value, the corrected document image 304 is sharp. Whereas, if the aspect ratio of the corrected document image 304 is greater than the sharpness threshold value, the corrected document image 304 is distorted or blurred. In a case that the corrected document image 304 is sharp, the corrected document image 304 is directly shown on the screen 104 to be viewed by the user and the tilt correcting parameter in this situation is recorded. For capturing an image of another document by the image pickup device 105 in the next time, the image processing program will correct the image according to the tilt correcting parameter if the included angle b between the upper cover and the base is rendered. Whereas, in another case that the corrected document image 304 is blurred, the notebook computer 100 issues a warning sound to warn a user of adjusting the included angle b. An example of the warning sound includes a beep sound or a pre-recorded voice. The contents of the pre-recorded voice include the prompt of warning the user of decreasing or increasing the included angle such that a sharp document image is captured after the included angle adjusting procedure.

Figure 8:
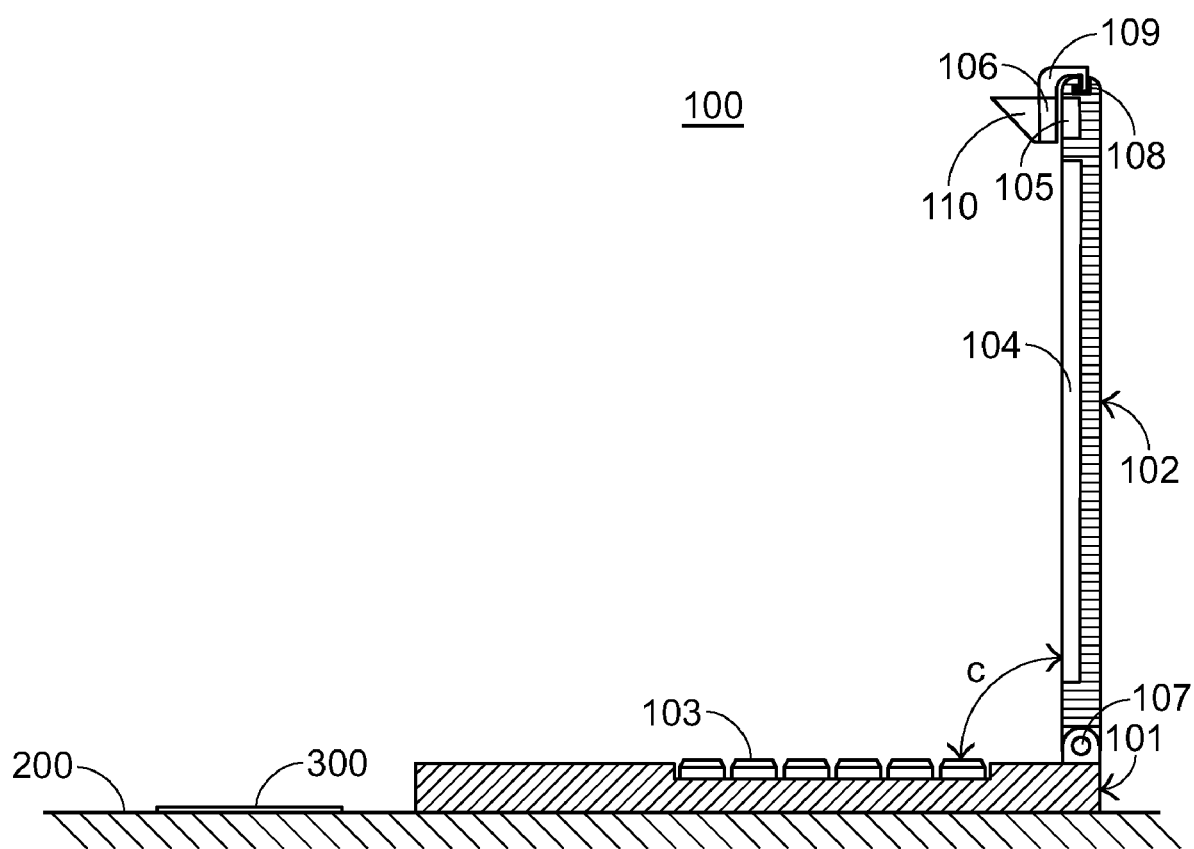
FIG. 8 is a schematic side view of the notebook computer according to the third preferred embodiment of the present invention.

FIG. 8 is a schematic side view of the notebook computer according to the third preferred embodiment of the present invention. The components contained in the notebook computer 100 of FIG. 8 are identical to those shown in FIGS. 2 and 5, and are not redundantly described herein. For avoiding the inconvenience of adjusting the included angle, a refractor 110 is arranged on the close-up lens 106. The included angle c between the upper cover 102 and the base 101 is nearly 90°, which is the normal included angle when the notebook computer 100 is operated. By means of the refractor 110, the image pickup device 105 is able to capture the image of the document 300 on the working plane 200. After the image of the document 300 is captured, the image processing program performs a trapezoidal correction on the document image in order to compensate the tilted distortion of the document image 301. After the trapezoidal correction, a corrected document image is obtained. In this embodiment, the procedure of rotating the upper cover 102 to adjust the included angle between the upper cover 102 and the base 101 is omitted. Moreover, the image of the document 300 during the capturing period and the corrected document image after captured may be directly shown on the screen 104 so as to be viewed by the user.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A notebook computer for capturing an image of a document on a working plane, said notebook computer comprising:
   a base having a keyboard for inputting characters or signs therevia; and
   an upper cover coupled to said base and rotatable with respect to said base, and comprising:
      a screen for displaying said image of said document;
      an image pickup device disposed on an upper edge of said upper cover for capturing said image of said document when said upper cover is rotated with respect to said base to create a specified included angle between said upper cover and said base;
      a recess structure; and
      a close-up lens for shortening the focal length of said image pickup device, said close-up lens has a hooking element engaged with said recess structure such that said close-up lens is fixed on said upper cover,
   wherein an image processing program is installed in said notebook computer for performing an image processing operation on said document after said image of said document on said working plane is captured by said image pickup device.

2. The notebook computer according to claim 1 wherein said image processing operation performed by said image processing program includes trapezoidal correction, contrast enhancement, background removal or optical character recognition.

3. The notebook computer according to claim 2 wherein distortion of said image of said document is corrected by said trapezoidal correction when said included angle is within a preset angle range, and said preset angle range is determined according to the thickness of said notebook computer or the location of said document.

4. The notebook computer according to claim 3 wherein said image processing operation further comprises an included angle adjusting procedure for correcting said image of said document if said included angle between said upper cover and said base is beyond said preset angle range.

5. The notebook computer according to claim 4 wherein said included angle adjusting procedure comprises steps of:
   placing said document on a calibration paper having multiple checkers to cover a portion of the calibration paper, wherein borders of said document are substantially parallel with vertical and horizontal lines of said checkers;
   capturing an image of said document and said calibration paper to obtain a tilted image, wherein said tilted image comprises a tilted document image area and a tilted calibration paper image area; and
   performing shape correction to correct corners of said checkers shown in said tilted calibration paper image into right angles.

6. The notebook computer according to claim 1 wherein said included angle is 90° and said notebook computer further comprises a refractor arranged on said close-up lens for capturing said image of said document.

7. The notebook computer according to claim 6 wherein said image processing operation performed by said image processing program includes trapezoidal correction, contrast enhancement, background removal or optical character recognition.

8. A method of capturing an image of a document by an image pickup device of a notebook computer, said notebook computer being placed on a working plane and comprising a base and an upper cover including said image pickup device and a close-up lens, said image pickup device being disposed on an upper edge of said upper cover, and said close-up lens being disposed on a side of said image pickup device, said method comprising steps:

placing a calibration paper having multiple checkers on said working plane such that said calibration paper is disposed in one side of said notebook computer;

placing said document on said calibration paper to cover a portion of the calibration paper;

rotating said upper cover of said notebook computer such that said image pickup device and said close-up lens are aligned with said document and said calibration paper;

capturing an image of said document and said calibration paper by said image pickup device and said close-up lens, thereby obtaining a tilted image, wherein said tilted image comprises a tilted document image area and a tilted calibration paper image area;

correcting corners of said checkers shown in said tilted calibration paper image into right angles, thereby obtaining a tilt correcting parameter;

performing an image processing operation on said tilted document image according to said tilt correcting parameter, thereby obtaining a corrected document image; and discriminating whether said corrected document image is sharp or blurred, wherein if said corrected document image is sharp, said tilt correcting parameter is recorded and an image of another document is captured by said image pickup device according to said tilt correcting parameter; or if said corrected document image is blurred, a warning sound is issued from said notebook computer to warn a user of adjusting the angle between said upper cover and said base.

9. The method of capturing an image of a document by an image pickup device of a notebook computer according to claim 8 wherein an aspect ratio of said corrected document image is an index of discriminating whether said corrected document image is sharp or blurred.

10. The method of capturing an image of a document by an image pickup device of a notebook computer according to claim 9 wherein said corrected document image is sharp if said aspect ratio of said corrected document image is smaller than or equal to a sharpness threshold value, or said corrected document image is blurred if said aspect ratio of said corrected document image is greater than said sharpness threshold value.

11. The method of capturing an image of a document by an image pickup device of a notebook computer according to claim 8 wherein said image processing operation includes trapezoidal correction, contrast enhancement, background removal or optical character recognition.

* * * * *